United States Patent
Daniel et al.

(10) Patent No.: US 7,197,496 B2
(45) Date of Patent: Mar. 27, 2007

(54) MACRO-BASED DYNAMIC DISCOVERY OF DATA SHAPE

(75) Inventors: Brent H. Daniel, Morrisville, NC (US); Timo J. Salo, Cary, NC (US); Kevin J. Williams, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/761,183

(22) Filed: Jan. 20, 2004

(65) Prior Publication Data

US 2005/0160091 A1   Jul. 21, 2005

(51) Int. Cl.
G06F 17/30   (2006.01)

(52) U.S. Cl. .................... 707/3; 707/4; 707/5
(58) Field of Classification Search .............. 707/1, 707/3, 4, 103 R; 712/242
See application file for complete search history.

(56) References Cited

U.S. PATENT DOCUMENTS

| | | | |
|---|---|---|---|
| 5,920,873 A * | 7/1999 | Van Huben et al. ........ 707/202 |
| 5,953,526 A | 9/1999 | Day et al. |
| 6,105,043 A | 8/2000 | Francisco et al. |
| 6,128,612 A | 10/2000 | Brereton et al. |
| 6,356,892 B1 | 3/2002 | Corn et al. |
| 6,430,556 B1 | 8/2002 | Goldberg et al. |
| 6,484,180 B1 | 11/2002 | Lyons et al. |
| 6,496,833 B1 | 12/2002 | Goldberg et al. |
| 6,571,232 B1 | 5/2003 | Goldberg et al. |
| 6,842,906 B1 * | 1/2005 | Bowman-Amuah ......... 719/330 |
| 2002/0107840 A1 | 8/2002 | Rishe |
| 2003/0037039 A1 | 2/2003 | Mah et al. |
| 2003/0115194 A1 | 6/2003 | Pitts et al. |
| 2003/0120682 A1 | 6/2003 | Bestgen et al. |
| 2005/0027725 A1 * | 2/2005 | Kagalwala et al. ......... 707/100 |

* cited by examiner

Primary Examiner—Alford W. Kindred
(74) Attorney, Agent, or Firm—Gordon & Rees, LLP; A. Bruce Clay

(57) ABSTRACT

The present invention comprises a Dynamic Query Interface (DQI). The DQI provides an apparatus and method for dynamically discovering the shape of data returned by a DBMS in response to a query statement. The DQI comprises a Query Schema, a Select Macro, and a Macro Expansion Module (MEM). Unlike conventional query statements, a Select Macro only requires a select-clause. The MEM builds a conventional query statement from a Select Macro using information contained in the Query Schema. The Macro Token expansion approach implemented in the MEM obviates the need for full language parsing and is thus much more suited to runtime execution than prior art solutions. Furthermore, because the MEM examines a Select Macro at runtime, the MEM has the added advantage over prior art solutions of being able to discover dynamically the shape of the requested data at runtime.

29 Claims, 5 Drawing Sheets

FIG. 4

| Entity |
|---|
| Departments |
| Employees |

Entity table *302*

| ID | Table | Name | Type |
|---|---|---|---|
| 1 | Departments | ID | Int |
| 2 | Departments | Name | Text |
| 3 | Employees | ID | Int |
| 4 | Employees | Name | Text |
| 5 | Employees | Address | Text |
| 6 | Employees | DepartmentID | Int |

Field Table *304*

| ID | Parent | Child |
|---|---|---|
| 1 | 1 | 6 |

Relationship Table *306*

US 7,197,496 B2

MACRO-BASED DYNAMIC DISCOVERY OF DATA SHAPE

FIELD OF THE INVENTION

The invention relates to the field of computer databases. In particular, the invention relates to an apparatus and method for simplifying database query constructs and enabling a computer program to dynamically discover the order and type of data requested through the simplified query.

BACKGROUND OF THE INVENTION

The invention described in detail below will be understood best in light of the following discussion of the state of the art and the problem that the invention solves.

Electronic databases provide a solution for long-term storage needs, as well as rapid search and retrieval of information. A database is merely a collection of data stored together and organized for rapid search and retrieval. In general, a database stores information internally as one or more "tables." A table is a collection of "records" (also called "rows"), and a record is a collection of "fields" (also called "columns"). Every record in a given table must have the same number of fields. Fields contain discrete data values.

In general, most databases are either hierarchical or relational. A database that implements a hierarchical data model links data together by embedding pointers within the data. The links in a hierarchical database are static. Static links decrease the complexity of data access, but limit flexibility. The relational model evolved as a means to improve the flexibility of data access. Relational models do not rely on static links. Rather, relational models allow a user to link data together dynamically. Dynamic links, in turn, enable a user to tailor data access to specific needs.

Typically, a database management system (DBMS) provides a user interface (UI) through which a user may access the, information contained in a database. A DBMS commonly implements some form of command language that allows a user to construct a request for specific information. The Structured Query Language (SQL) is one example of a command language that has gained widespread acceptance in the art. A command that requests information from a database is referred to generally as a "query." A DBMS responds to a user's query by returning the requested information in a "result set." A result set may be displayed on the user's screen as a series of rows and columns, or may be saved to a file for future use or further processing.

Similarly, a DBMS usually provides an application program interface (API) through which other computer programs may access the information contained in a database. Although the implementations vary from one DBMS to another, many DBMS APIs make use of a command language similar to the command language that the DBMS implements in the UI. APIs commonly allow a programmer simply to embed the same command language within the program. And just as a DBMS returns a result set to a user in response to a user's query, a DBMS returns a result set to a program in response to the program's query.

A query generally consists of a statement that identifies what information should be retrieved and where that information can be found. Most DBMSs require a query to state (at a minimum) from which table or tables to retrieve the data (a "from-clause"), which fields to retrieve (a "select-clause"), and the selection criteria (a "where-clause"). If the query identifies two or more tables in a relational database, the query must also state the relation between the tables.

Regardless, though, of whether a DBMS is responding to a user's query or a program's query, the query statement determines the arrangement (or "shape") of the result set returned by a DBMS. In particular, the result set presents the fields in the order that they were stated in the select-clause. A user, of course, usually knows the order in which the fields were stated in the select-clause and, thus, knows the shape of the result set in advance. Similarly, a programmer that embeds query statements in a program knows the shape of the result set in advance. Advance knowledge of the result set's shape allows a programmer to build a program that anticipates a particular shape and processes the result set accordingly.

There are many occasions, however, when it is desirable to build programs that can interact with a database without knowing the shape of a result set in advance. For example, many programs are built to provide a layer of abstraction between a database and an end-user program. Programs that provide this layer of abstraction are commonly referred to as "middleware." In order to maximize usability and flexibility, a middleware program needs to be able to accommodate queries that come from an end-user program, or even end-users themselves. Thus, a middleware programmer usually will not know the result shape in advance, and must be able to discover dynamically the result shape as the program is executing. One possible method of dynamic shape discovery is to parse the query statement within the middleware program. Parsing a query statement, though, is a complicated process and requires substantial additional programming effort. Furthermore, the parsing method would result in slower execution and redundant parsing, since a DBMS must also parse the query statement. Therefore, a need exists for a method of dynamically discovering the shape of a result set, without the development and use of a complicated and time consuming language parser.

SUMMARY OF THE INVENTION

The present invention comprises a Dynamic Query Interface (DQI). The DQI provides an apparatus and method for dynamically discovering the shape of data returned by a DBMS in response to a query statement. The DQI comprises a Query Schema, a Select Macro, and a Macro Expansion Module (MEM).

A Query Schema comprises information about particular Query Entities and, if needed, Schema Relations. In particular, a Query Schema includes the names and types of fields that comprise each Query Entity.

A Select Macro comprises a query statement written in terms of the Query Entities and Schema Relations. Unlike conventional query statements, a Select Macro only requires a select-clause. The MEM builds a conventional query statement from a Select Macro. The MEM first breaks a Select Macro into Macro Tokens, and then compares each Macro Token with each Query Entity in the Query, Schema. Then, if a Macro Token matches a Query Entity, the MEM expands the Macro Token to include the Query Entity fields designated in the Query Schema. The MEM also adds the matching Query Entity to the Select Macro as a from-clause and creates an appropriate join-clause based on Schema Relations.

The Macro Token expansion approach implemented in the MEM obviates the need for full language parsing and is thus much more suited to runtime execution than prior art solutions. Furthermore, because the MEM examines a Select Macro at runtime, the MEM has the added advantage over prior art solutions of being able to discover dynamically the shape of the requested data at runtime.

BRIEF DESCRIPTION OF DRAWINGS

FIG. 4 provides an example of a Query Schema for two tables; and

DETAILED DESCRIPTION OF THE PREFERRED EMBODIMENT

The foregoing and other objects, features, and advantages of the invention will be apparent from the following more particular description of the preferred embodiment of the invention, as illustrated in the accompanying drawings wherein like reference numbers represent like parts of the invention.

As used herein, the term "database" means any collection of data stored together and organized for rapid search and retrieval, including without limitation flat file databases, fielded databases, full-text databases, object-oriented databases, and relational databases.

The term "from-clause" refers to a clause within a query that defines the data source or sources from which data should be retrieved.

The term "join-clause" refers to a clause within a query that defines one or more relationships between two or more data sources.

The term "query" refers to any statement that a processor recognizes as an instruction to retrieve data from a database.

The term "result set" means any collection of data retrieved from a database as a collection of records.

The term "result shape" means the order of fields within a result set.

The term "select-clause" refers to a clause within a query that defines which data should be retrieved.

As a person of skill in the art will appreciate, the DQI may be implemented in many different configurations, including software, hardware, or any combination thereof. For the sake of clarity and simplicity, the following discussion uses SQL to illustrate the operation of the preferred embodiment of the DQI. The use of SQL in the following discussion is not intended as a limitation of the present invention. SQL is a standardized query language well known to a person skilled in the art, and the syntax of SQL need not be described in detail here. A person of skill in the art will appreciate that any query language can be used with the present invention.

Figure 1:
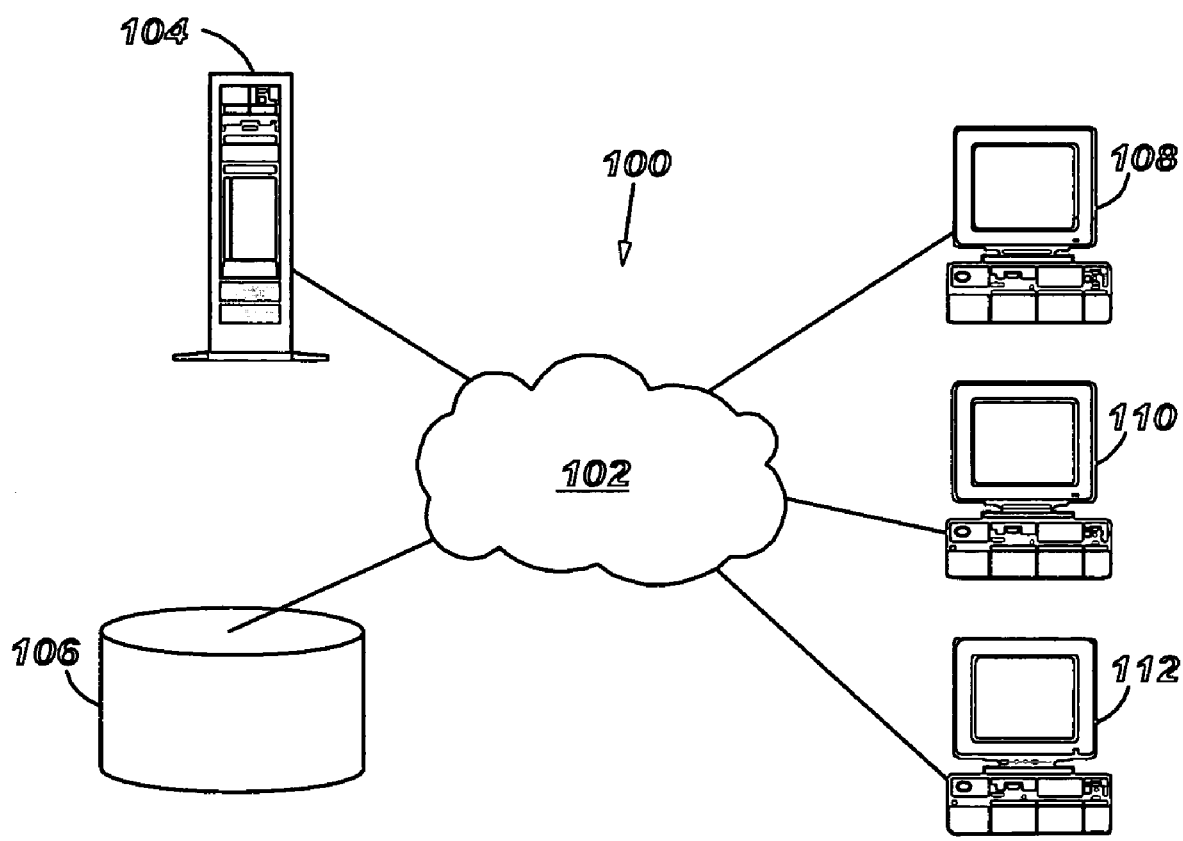
FIG. 1 is a depiction of a typical networked computing environment in which the integrated server architecture could be implemented.

FIG. 1 is an illustration of computer network 100 associated with the present invention. Computer network 100 comprises local workstation 108 electrically coupled to network connection 102. Local workstation 108 is electrically coupled to remote workstation 110 and remote workstation 112 via network connection 102. Local workstation 108 is also electrically coupled to server 104 and persistent storage 106 via network connection 102. Network connection 102 may be a simplified local area network (LAN) or may be a larger network such as a wide area network (WAN) or the Internet. Furthermore, computer network 100 depicted in FIG. 1 is intended as a representation of a possible operating network that may contain the present invention and is not meant as an architectural limitation.

Figure 2:
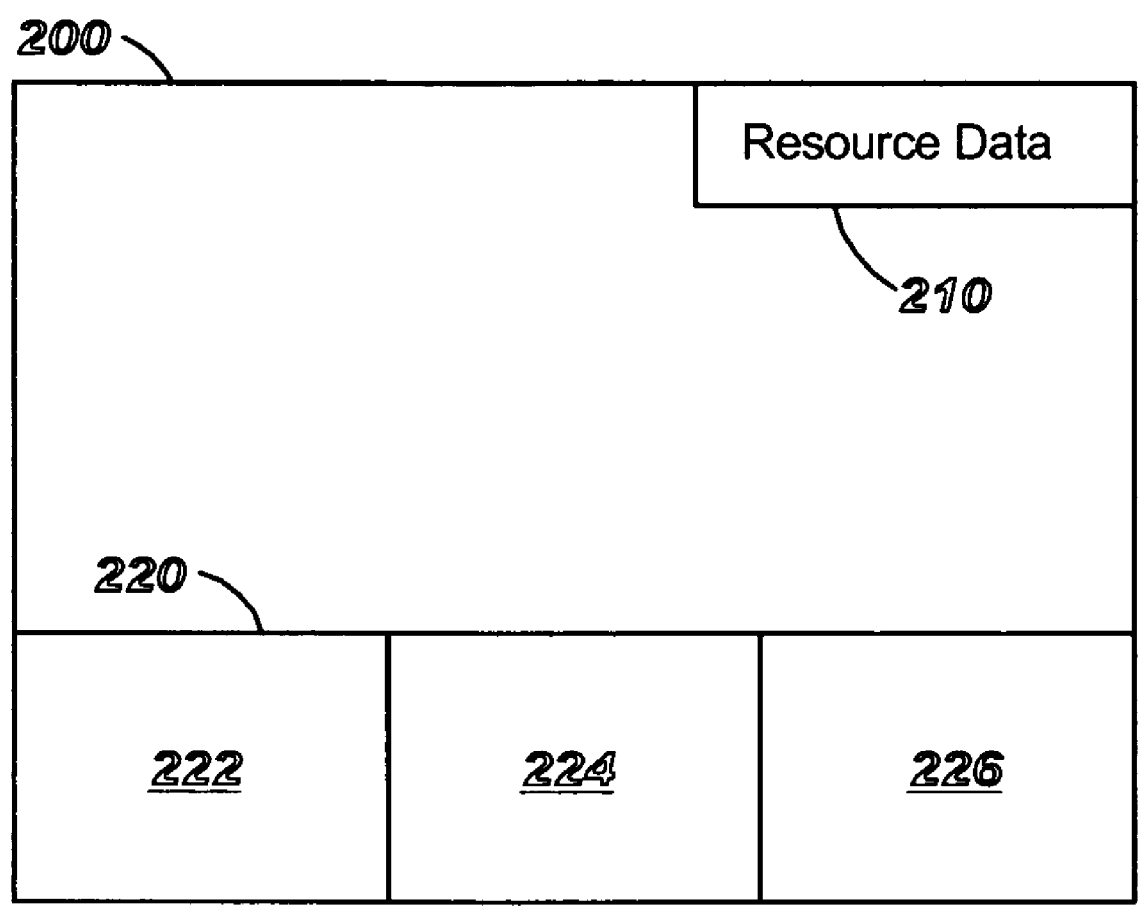
FIG. 2 represents the memory configuration of a typical computing workstation using the integrated server architecture.

The internal configuration of a computer, including connection and orientation of the processor, memory, and input/output devices, is well known in the art. The present invention is a methodology that can be embodied in a computer program. Referring to FIG. 2, the methodology of the present invention is implemented in DQI 220, which resides in memory 200. DQI 220 comprises Query Schema 222, one or more Select Macros 224, and Macro Expansion Module (MEM) 226. DQI 220, including Query Schema 222, Select Macro 224, and MEM 226 described herein can be stored within memory 200 of any workstation or server depicted in FIG. 2. Alternatively, DQI 220, including Query Schema 222, Select Macro 224, and MEM 226 can be stored in an external storage device such as persistent storage 106, or a removable disk such as a CD-ROM (not pictured). Memory 200 is only illustrative of memory within one of the machines depicted in FIG. 2 and is not meant as a limitation. Memory 200 also contains resource data 210. The present invention may interface with resource data 210 through memory 200.

In alternative embodiments, DQI 220 and/or any of the gateways can be stored in the memory of other computers. Storing DQI 222 and/or gateways in the memory of other computers allows the processor workload to be distributed across a plurality of processors instead of a single processor. Further configurations of DQI 220 across various multiple memories and processors are known by persons skilled in the art.

Figure 3:
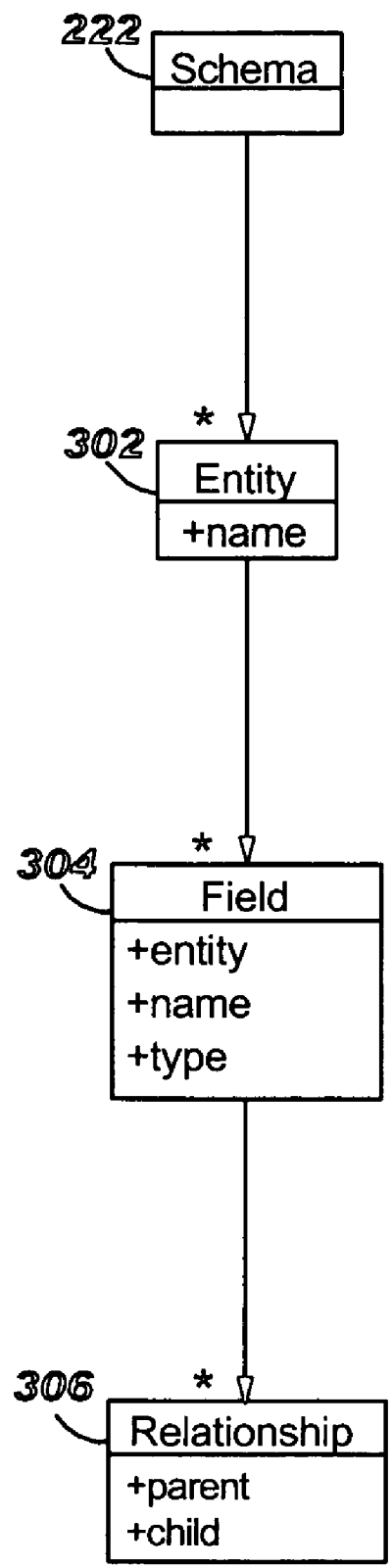
FIG. 3 illustrates the model for a Query Schema.

FIG. 3 illustrates the model for Query Schema 222. In the preferred embodiment, as shown in FIG. 3, Query Schema 222 is itself implemented as a relational database. Query Schema 222 is comprised of an "Entity" table 302, a "Field" table 304, and a "Relationship" table 306. Entity table 302 may contain many records for Query Entities. A Query Entity is any data structure composed of records, where each record contains one or more fields. In general, a Query Entity corresponds to a database table, but may also be any other collection of data that can be represented as columns and rows, such as a database view. Every Query Entity in Entity table 302 should have one or more corresponding records in Field table 304. Field table 304 contains a record for each field to be queried. Each record in Field table 304 should include the name of the field, but may also include additional information such as the type of data value bound to the field. Relationship table 306 contains a record for each pair of fields that creates a relationship between two or more Query Entities.

FIG. 4 provides an example of Query Schema 222 for two tables. The example in FIG. 4 illustrates a Query Schema 222 for a typical business database consisting of employee information. For this example, the hypothetical database contains at least two tables. The first table is named "Departments" and contains information about all the departments within the business. The second table is named "Employees" and consists of information about employees, including which department the employee works in. The database itself could contain many additional tables, but tables do not need to be included in Query Schema 222 unless they will be referenced in a Select Macro. Thus, for the sake of clarity and simplicity, this example will be limited to the Departments and Employees tables of the hypothetical database. Referring to FIG. 4, Entity table 302 in example Query Schema 222 consists of two entries corresponding to the two tables just described. Field table 304 contains an entry for each field in each table listed in Entity table 302 that might be used in a Select Macro. In FIG. 4, Field table 304 contains two entries for fields in the Departments table. The Departments fields are named "ID" and "Name." Similarly, Field table 304 also includes four entries for the Employees table. The Employee fields used in this example are named "ID," "Name," "Address," and "DepartmentID." Note that in this example, Field table 304 also includes the type of data value that each respective field holds (i.e. "Int" for an integer value, or "Text" for character values). Relationship table 306 in FIG. 4 indicates that there is a single Entity Relation in example Query Schema 222. The "Parent" field and the "Child" field in Relationship table 306 refer to specific (but different) IDs in Field table 304. In this example, the single record in Relationship table 306 indicates that the ID field in the Departments table is related to the DepartmentID field in the Employees table. In particular, Relationship table 306 indicates that DepartmentID is dependent upon ID as a parent. In the context of a relational database, ID would be a "primary key" and DepartmentID would be a "foreign key."

Figure 5:
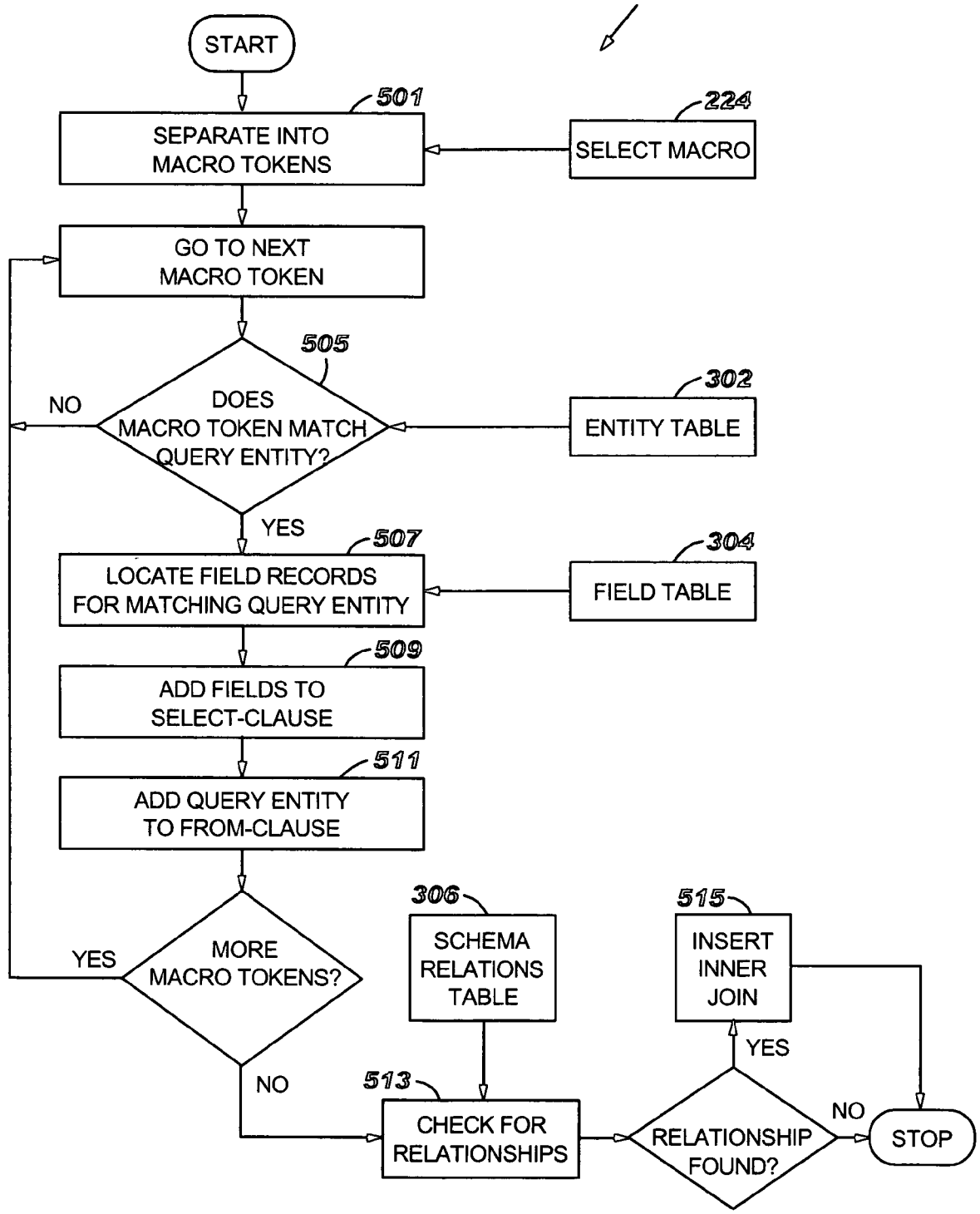
FIG. 5 illustrates the operation of the Macro Expansion Module on a Select Macro in the context of the Query Schema in FIG. 4.

A Select Macro comprises a query statement written in terms of Query Entities and Schema Relations. Unlike conventional query statements, though, a Select Macro only requires a select-clause. Thus, a simple Select Macro may consist of just two words—the "select" keyword and a Query Entity. For example, using the hypothetical database and example Query Schema 222 illustrated in FIG. 4 and discussed above, a simple two-word Select Macro would read:

select Departments;

Of course, any and all Query Entities in Query Schema 222 may be referenced. Thus, a Select Macro that references all the tables in Query Schema 222 would read:

select Departments, Employees;

Finally, a Select Macro may also contain a where-clause that restricts the results. Expanding upon the previous example, a Select Macro that restricts the results to a single employee would read:

select Departments, Employees where Departments.ID=555;

A person of ordinary skill in the art will appreciate that a where-clause may be as complex as needed without affecting the shape of the result. Thus, a Select Macro may contain a complex where-clause originally developed for other queries, thereby decreasing development time and expense. FIG. 5 illustrates the operation of MEM 226 on this last example, Select Macro 224, in the context of example Query Schema 222 discussed above. MEM 226 begins by reading Select Macro 224 and breaking it down into Macro Tokens (501). Here, the Macro Tokens would consist of 'select', 'Departments', 'Employees', 'where,' and 'Departments.ID=555'. MEM 226 then compares each Macro Token with each Query Entity in Entity table 302 (505). If MEM 226 matches a Macro Token with a Query Entity, then MEM 226 examines Field table 304, retrieves all fields associated with the-matched Query Entity (507), and adds each field to the select-clause (509). Thus, after MEM 226 matches the 'Departments' and 'Employees' Macro Tokens with their respective Query Entities, example Select Macro 224 would read:

select Departments.ID, Departments.Name, Employees.ID, Employees.Name, Employees.Address, Employees.DepartmentID where Department.ID=555;

MEM 226 also creates a from-clause and appends each matched Query Entity (511). Thus, example Select Macro 224 becomes:

select Departments.ID, Departments.Name, Employees.ID, Employees.Name, Employees.Address, Employees.DepartmentID from Departments, Employees where Department.ID=555;

Finally, MEM 226 examines Relationship table 306 to check for Schema Relations (513). As discussed above, Relationship table 306 in this example indicates that Departments.ID and Employees.DepartmentID are related. Specifically, Departments.ID is a parent key and Employees.DepartmentID is a child key in the relationship. Since both keys belong to Query Entities that have been referenced in Select Macro 224 (i.e. Departments and Employees), MEM 226 inserts an inner join based on the entry in Relationship table 306 (515). Thus, the final version of the Select Macro that is forwarded to a DBMS reads as follows:

select Departments.ID, Departments.Name, Employees.ID, Employees.Name, Employees.Address, Employees.DepartmentID from Departments inner join Employees on Departments.ID=Employees.DepartmentID where Department.ID=555;

Referring again to FIG. 5 and the preceding discussion, a person of skill in the art will appreciate that MEM 226 can retain the number and order of fields added to the select clause as the fields are added. Thus, MEM 226 can dynamically discover the result shape of a Select Macro at runtime with little or no additional processing. Dynamic discovery of the result shape also enables MEM 226 to create internal data structures dynamically to retain the results for further processing. In the preferred embodiment, MEM 226 uses data objects to retain result sets. Data objects and object-oriented techniques are well known in the art and need not be described in detail here. MEM 226 creates a data object for each Query Entity in the select-clause. Thus, in the above example, MEM 226 would create a Department object having ID and Name attributes, and an Employee object having ID, Name, Address, and DepartmentID attributes. Furthermore, just as MEM 226 creates a join-clause based on Relationship table 306, MEM 226 can also create a link or reference between objects based on Relationship table 306. In another embodiment, MEM 226 uses an array or arrays to retain the result set. The advantages of dynamic shape discovery, though, are not limited to creating data objects or arrays, and a person of ordinary skill in the art will appreciate the many varied applications of DQI 220.

Furthermore, a person skilled in the art will appreciate from the preceding discussion that various modifications and changes may be made to the preferred embodiment of the present invention without departing from its true spirit. This description is intended to be illustrative only and should not be construed in a limiting sense. The scope of the invention should be limited only by the language of the following claims.

What is claimed is:

1. A programmable apparatus for building query statements, comprising
   a processor;
   a memory;
   a query schema in the memory, the query schema describing one or more query entities;
   a select macro in the memory; and
   a macro expansion program in the memory directing the processor to separate the select macro into a plurality of macro tokens;

compare each macro token with each query entity; and
responsive to matching a macro token with a query entity, expand the matched macro token according to the query schema;
  wherein each query entity comprises one or more entity fields; and the macro expansion program in the memory further directs the processor to
  execute the modified select macro;
  create a data object for each macro token that matches a query entity, each data object having one or more data attributes; and
assign entity field values to data attributes according to the query schema.

2. The programmable apparatus of claim 1 wherein
the macro expansion program in the memory further directs the processor to append a from-clause to the select-clause, the from-clause comprising all query entities that are matched with macro tokens in the select-clause.

3. The programmable apparatus of claim 2 wherein
each query entity comprises one or more entity fields; and
the macro expansion program in the memory further directs the processor to execute the modified select macro;
create a data object for each macro token that matches a query entity, each data object having one or more data attributes; and
assign entity field values to data attributes according to the query schema.

4. The programmable apparatus of claim 2 wherein
the query schema further comprises one or more schema relations, each schema relation defining relationships between two or more query entities; and
the macro expansion program in the memory further directs the processor to compare each macro token in the select-clause with each query entity defined in a schema relation;
responsive to matching a macro token with a schema relation, append a join-clause to the from-clause according to the schema relation; and
if the schema relation includes one or more query entities that are excluded from the from-clause, append the excluded query entities to the from-clause.

5. The programmable apparatus of claim 4 wherein
each query entity comprises one or more entity fields; and
the macro expansion program in the memory further directs the processor to execute the modified select macro;
create a data object for each macro token that matches a query entity, each data object having one or more data attributes; and
assign entity field values to data attributes according to the query schema.

6. The programmable apparatus of claim 5 wherein the select macro is written with Structured Query Language constructs.

7. The programmable apparatus of claim 5 wherein the macro expansion program is an object method program.

8. The programmable apparatus of claim 5 wherein the query entity is a database table.

9. The programmable apparatus of claim 5 wherein the query entity is a database view.

10. A computer readable memory for causing a computer to build query statements, comprising:
a computer readable storage medium;
a select macro stored in the storage medium;
a query schema stored in the storage medium, the query schema describing one or more query entities; and
a macro expansion program stored in the storage medium, wherein the storage medium, so configured by the macro expansion program, causes the program to separate the select macro into a plurality of macro tokens;
compare each macro token with each query entity; and
responsive to matching a macro token with a query entity, expand the matched macro taken according to the query schema;
  wherein each query entity comprises one or more entity fields; and the macro expansion program stored in the storage medium further directs the processor to
  execute the modified select macro;
create a data object for each macro token that matches a query entity, each data object having one or more data attributes; and
assign entity field values to data attributes according to the query schema.

11. The computer readable storage medium of claim 10 wherein
the select macro comprises a select-clause; and
the macro expansion program stored in the storage medium further directs the processor to append a from-clause to the select-clause, the from-clause comprising all query entities that are matched with macro tokens in the select-clause.

12. The computer readable storage medium of claim 11 wherein
each query entity comprises one or more entity fields; and
the macro expansion program stored in the storage medium further directs the processor to
execute the modified select macro;
create a data object for each macro token that matches a query entity, each data object having one or more data attributes; and
assign entity field values to data attributes according to the query schema.

13. The computer readable storage medium of claim 11 wherein
the query schema further comprises one or more schema relations, each schema relation defining relationships between two or more query entities; and
the macro expansion program stored in the storage medium further directs the processor to
compare each macro token in the select-clause with each query entity defined in a schema relation;
responsive to matching a macro token with a schema relation, append a join-clause to the from-clause according to the schema relation; and
if the schema relation includes one or more query entities that are excluded from the from-clause, append the excluded query entities to the from-clause.

14. The computer readable storage medium of claim 13 wherein
each query entity comprises one or more entity fields; and
the macro expansion program stored in the storage medium further directs the processor to
execute the modified select macro;
create a data object for each macro token that matches a query entity, each data object having one or more data attributes; and
assign entity field values to data attributes according to the query schema.

15. The computer readable storage medium of claim 14 wherein the select macro is written with Structured Query Language constructs.

16. The computer readable storage medium of claim 14 wherein the macro expansion program is an object method program.

17. The computer readable storage medium of claim 14 wherein the query entity is a database table.

18. The computer readable storage medium of claim 14 wherein the query entity is a database view.

19. A method of deploying a program for building query statements, comprising the steps of:
  installing the program on a computer;
  wherein the program performs the steps of:
  separating a select macro into a plurality of macro tokens;
  comparing each macro token with one or more query entities described in a query schema;
  responsive to matching a macro token with a query entity, expanding the matched macro token according to the query schema;
  executing the modified select macro;
  creating a data object for each macro token that matches a query entity, each data object having one or more data attributes; and
  assigning entity field values to data attributes according to the query schema.

20. The method of claim 19 further comprising the step of:
  appending a from-clause to the select macro, the from-clause comprising all query entities that are matched with macro tokens in the select macro.

21. The method of claim 20 further comprising the steps of:
  executing the modified select macro;
  creating a data object for each macro token that matches a query entity, each data object having one or more data attributes; and
  assigning entity field values to data attributes according to the query schema.

22. The method of claim 19 further comprising the steps of:
  comparing each macro token with one or more query entities defined in a schema relation;
  responsive to matching a macro token with a schema relation, append a join-clause to the from clause according to the schema relation; and
  if the schema relation includes one or more query entities that are excluded from the from-clause, append the excluded query entities to the from-clause.

23. The method of claim 22 further comprising the steps of:
  executing the modified select macro;
  creating a data object for each macro token that matches a query entity, each data object having one or more data attributes; and
  assigning entity field values to data attributes according to the query schema.

24. The method of claim 23 wherein the select macro is written with Structured Query Language constructs.

25. The method of claim 23 wherein the query entity is a database table.

26. The method of claim 23 wherein the query entity is a database view.

27. An apparatus for building query statements, the apparatus comprising:
  means for separating a select macro into a plurality of macro tokens;
  means for comparing each macro token with one or more query entities described in a query schema;
  responsive to matching a macro token with a query entity, means for expanding the matched macro token according to the query schema;
  means for appending a from-clause to the select macro, the from-clause comprising all query entities that are matched wit macro tokens in the select macro;
  means for comparing each macro token with one or more query entities defined in a schema relation;
  responsive to matching a macro token with a schema relation, means for appending a join-clause to the from clause according to the schema relation;
  if the schema relation includes one or more query entities that are excluded from the from-clause, means for appending the excluded query entities to the from-clause;
  means for executing the modified select macro;
  means for creating a data object for each macro token tat matches a query entity, each data object having one or more data attributes; and
  means for assigning entity field values to data attributes according to the query schema;
  wherein the select macro is written with Structured Query Lanizuawe Constructs.

28. The apparatus of claim 27 wherein the query entity is a database table.

29. The apparatus of claim 27 wherein the query entity is a database view.

* * * * *